(12) United States Patent
Harris

(10) Patent No.: US 9,848,726 B2
(45) Date of Patent: Dec. 26, 2017

(54) VEGETABLE PEELER

(71) Applicant: Johnny Todd Harris, Delray Beach, FL (US)

(72) Inventor: Johnny Todd Harris, Delray Beach, FL (US)

(*) Notice: Subject to any disclaimer, the term of this patent is extended or adjusted under 35 U.S.C. 154(b) by 325 days.

(21) Appl. No.: 14/027,577

(22) Filed: Sep. 16, 2013

(65) Prior Publication Data

US 2015/0075011 A1 Mar. 19, 2015

(51) Int. Cl.
*A47J 17/02* (2006.01)
*B26D 3/26* (2006.01)
*B26B 5/00* (2006.01)

(52) U.S. Cl.
CPC ............. *A47J 17/02* (2013.01); *B26B 5/008* (2013.01); *B26D 3/26* (2013.01)

(58) Field of Classification Search
CPC . A47J 17/02; A47J 25/00; A47J 23/00; A23N 4/12; A01J 23/00; B26D 3/24–3/26; B26D 3/04; B26B 5/008
USPC ......... 30/114, 279.2, 279.4, 279.6, 299, 301, 30/302, 303, 113.1–113.3, 121.5; 99/541, 99/565, 588, 590, 595; D7/672–674; 425/132
See application file for complete search history.

(56) References Cited

U.S. PATENT DOCUMENTS

| | | | | |
|---|---|---|---|---|
| 1,418,868 A | * | 6/1922 | Fogelquist | B26D 3/24 30/114 |
| 3,509,785 A | * | 5/1970 | Fuchs, Jr. | B21D 22/20 72/347 |
| 5,967,025 A | * | 10/1999 | Tashiro | A21C 11/00 425/132 |
| 5,974,668 A | * | 11/1999 | Butzer | A24F 13/24 30/110 |

OTHER PUBLICATIONS

Curve. (2015). In the Chambers Dictionary. London, United Kingdom: Chambers Harrap. Retrieved from http://search.credoreference.com/content/entry/chambdict/curve/0.*

* cited by examiner

*Primary Examiner* — Andrea Wellington
*Assistant Examiner* — Evan MacFarlane
(74) *Attorney, Agent, or Firm* — Shutts & Bowen LLP

(57) ABSTRACT

In accordance with one aspect of the invention, an apparatus for peeling and cutting vegetables and other foods is provided. A plurality of blades form an aperture within a frame. This aperture expands as the vegetable passes through it. This method of food surface removal expedites the process by removing all sides of the vegetable surface at the same time, providing heightened safety features for users, allowing users to easily clean the apparatus, and allowing users to easily remove and replace broken blades or change blade types for a variety of culinary purposes.

18 Claims, 17 Drawing Sheets

VEGETABLE PEELER

BACKGROUND OF THE INVENTION

Field of Invention

The present invention relates to an apparatus for peeling a food having a peel.

SUMMARY OF THE INVENTION

An apparatus for peeling a food having a peel is described herein.

In one embodiment of the invention, an apparatus consisting of a circular frame and five interlocking blades may be held in a user's hand. The five blades interlock near the center of the device and form an aperture. A food having a peel or rind is passed through the aperture formed by the interlocking blades, which blades remove the peel or rind from the food.

In another embodiment of the invention the frame of the apparatus can be of any geometric shape.

In another embodiment, any number of blades may be used.

In yet another embodiment, the blades may be removable from the frame by the user of the apparatus to facilitate changing blades, cleaning the apparatus, and as a safety mechanism.

In still another embodiment, the blades me be of different types, such as straight, French, julienne, serrated, or corn dekerneler.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
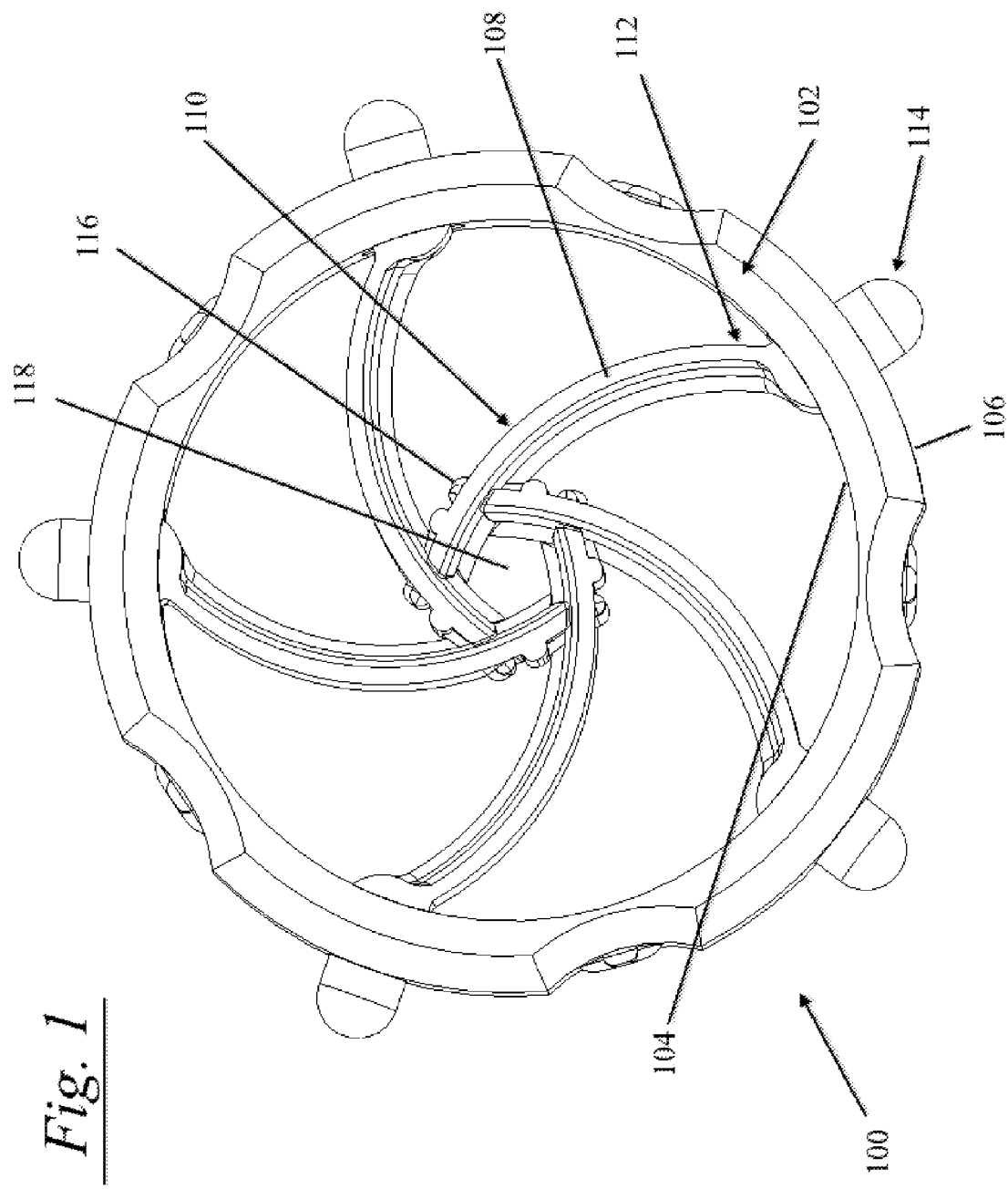
FIG. 1 is a top view of one embodiment of the apparatus.
Figure 2:
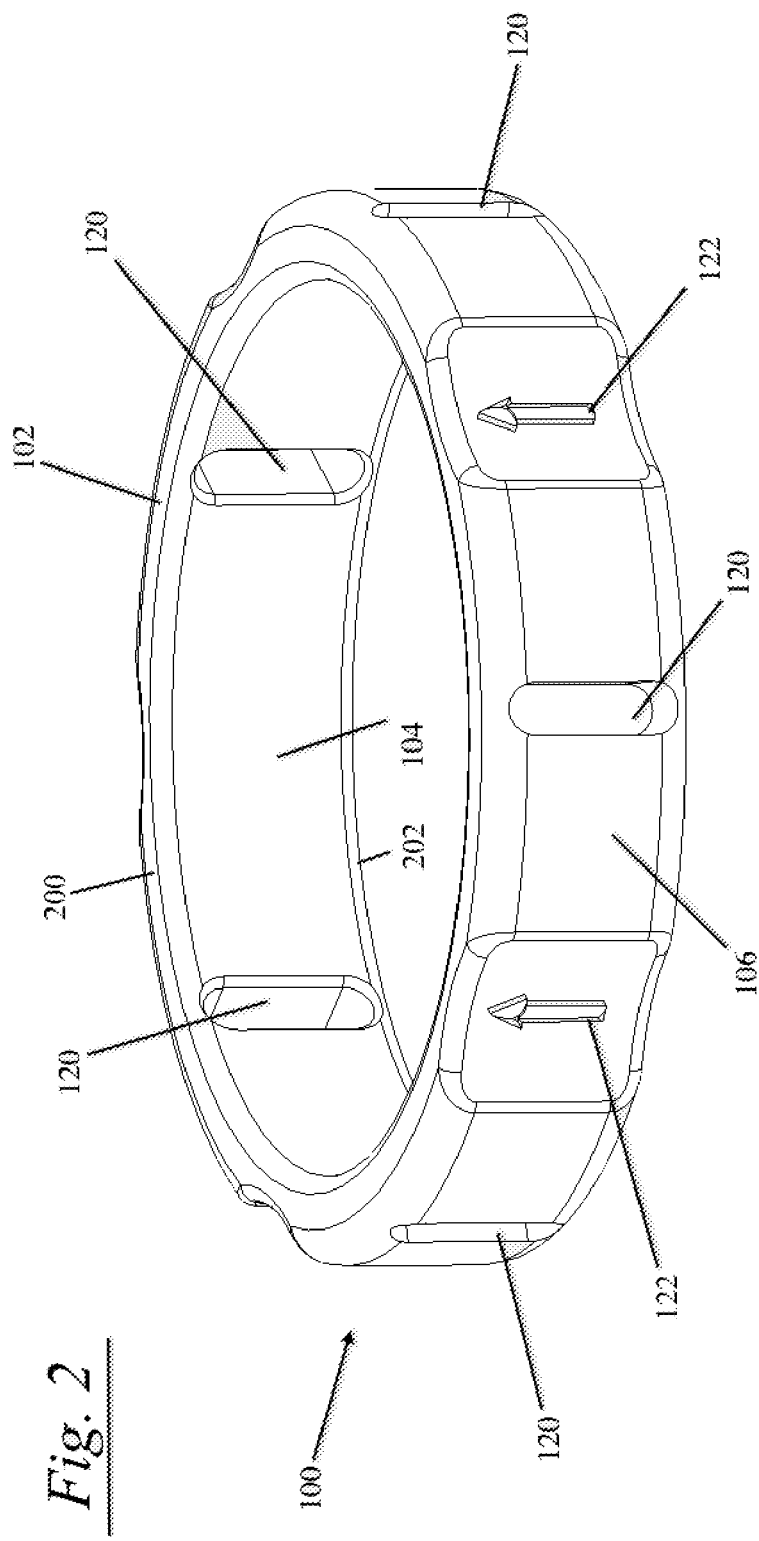
FIG. 2 is an orthogonal view of one embodiment of the apparatus.
Figure 3:
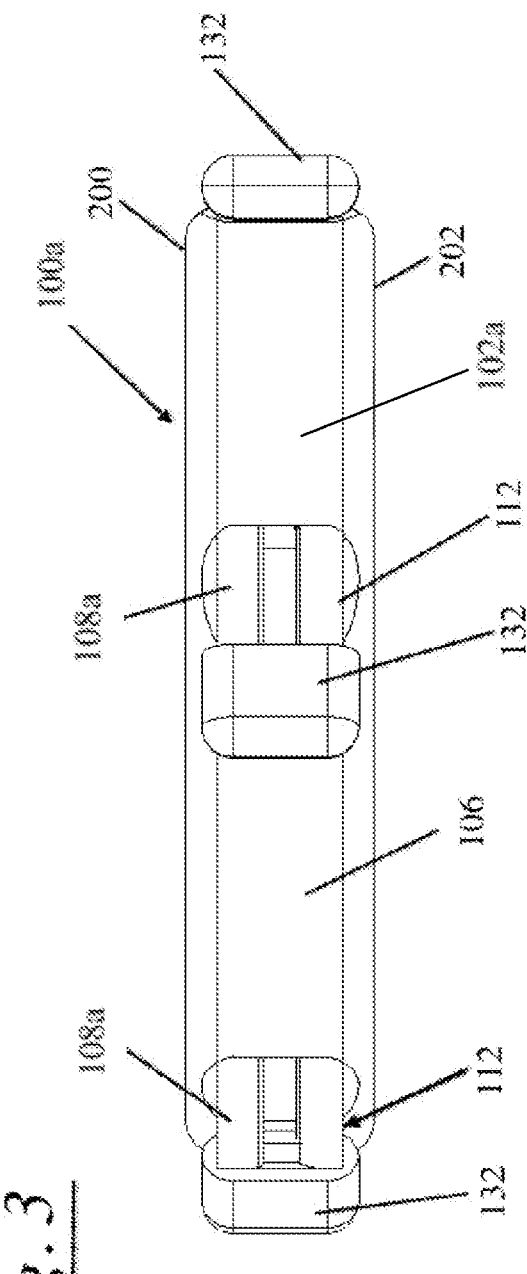
FIG. 3 is a side view of one embodiment of the apparatus.
Figure 4:
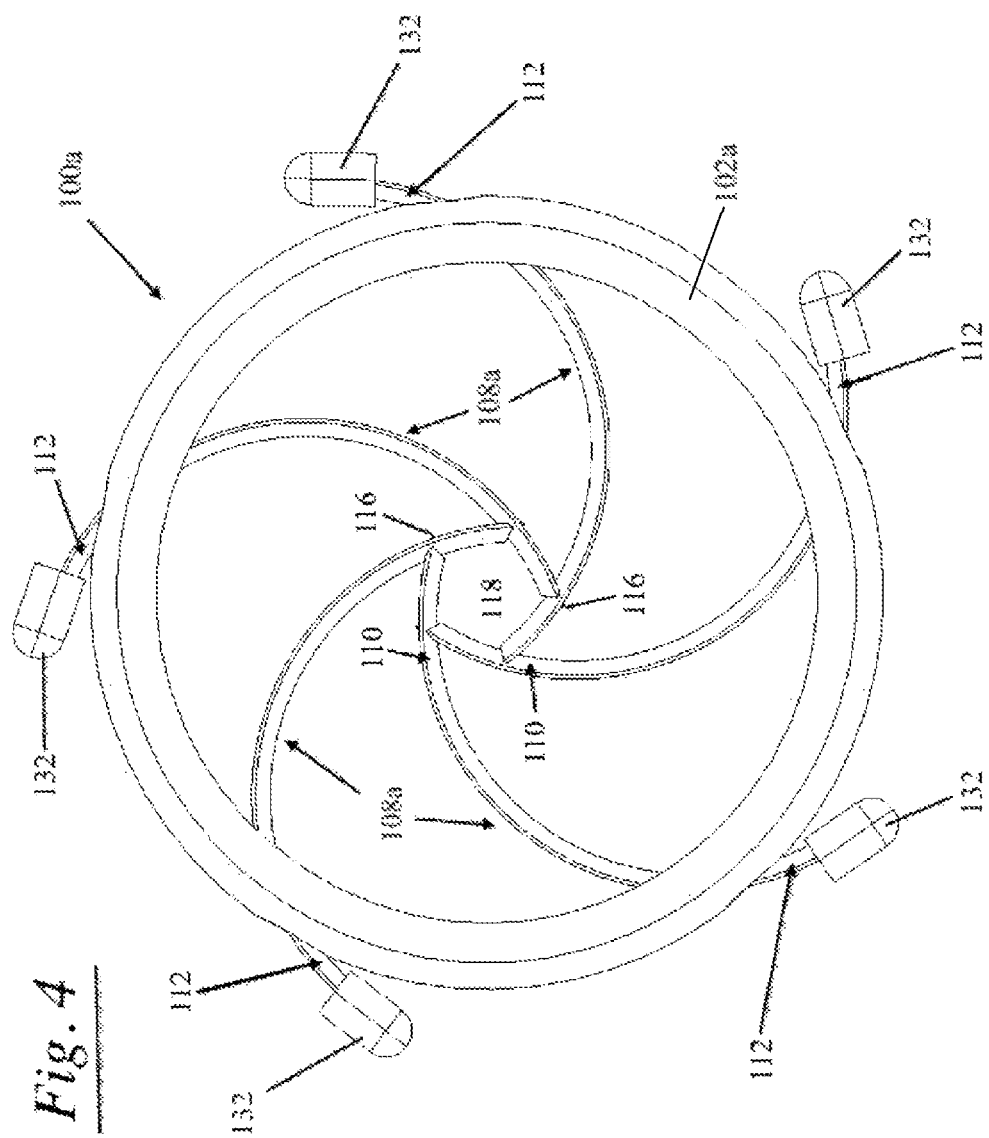
FIG. 4 is a top view of another embodiment of the apparatus.
Figure 5:
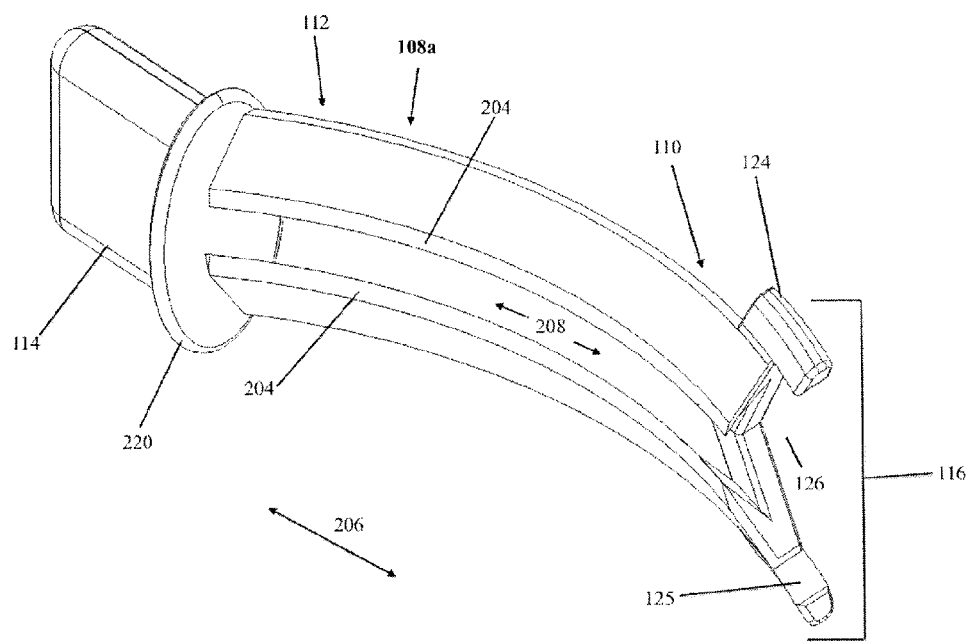
FIG. 5 is an orthogonal view of one embodiment of a blade element of the apparatus.

The apparatus [100] may be embodied in any number of ways. With reference to FIGS. 1 and 2, one embodiment of the invention, comprises a frame [102] having a top side [200], a bottom side [202], an inner surface [104], an outer surface [106], and a thickness, the thickness being defined as the distance between the outer surface [106] and the inner surface [104] on a line parallel with the top side [200] and bottom side [202] of the frame [102]. The frame [102] also comprises a plurality of holes [120] traversing the thickness of the frame passing through both the inner surface [104] and the outer surface [106] of the frame [102]. The apparatus [100] further comprises a plurality of interlocking blade elements [108] located generally within the inner surface [104] of the frame [102]. The frame [102] may also comprise ergonomic indentations [122] on the outer surface [106], which indentations [122] make it easier and more comfortable for the user to grip the frame [102] and use the apparatus [100]. The indentations [122] may also contain information directing the user on how to hold the apparatus, how to use the apparatus, safety information, or any other information that may be desirable to communicate to the user of the apparatus [100]. Alternatively, instead of or in conjunction with the indentations [122] there may be protrusions or a covering applied or attached to the outer surface [106] of the frame [102]. With reference to FIGS. 1, 11, 13, and 14, the frame [102] of the apparatus [100] may be of variable geometry, including circular, oval, pentagonal, square, triangular, and others, and may have a varying number of blade elements [108] with a minimum of three blade elements.

With reference to FIGS. 1, 2, 5, and 6, contained within the frame [102] are a plurality of interlocking blade elements [108, 108a]. Each blade element [108, 108a] further comprises an inner end [110], an outer end [112, 112a], a vertical plane [203], and a blade surface [204] having a height generally parallel to the vertical plane [203]. The outer end [112, 112a] of each blade element [108, 108a] comprises an attachment mechanism, which moveably connects the blade element [108, 108a] to the frame [102] through one of the plurality of holes [120] traversing the thickness of the frame [102]. Additionally, the inner end [110] of each blade element [108, 108a] comprises at least one guide [116], the guide [116] slidably interlocks with a second blade located generally within the space formed within the inner surface [104] of the frame [102]. The plurality of blade elements [108, 108a] may be slidably interconnected with each other generally in the center of the space formed within the inner surface [104] of the frame [χ] to form an aperture [118]. The blade elements [108, 108a] may be curved or straight.

There are multiple different embodiments of the means of securing the blade elements within the frame. With reference to FIGS. 1 and 2, one embodiment of the securing mechanism comprises a tab [114] on the outer end [112] of the blade element [108] complementary to a hole [120] in the frame [102]. The tab [114] fits at least partway through a complementary hole [120] in the frame [102]. The tab [114] comprises a length and a circumference. The circumference and geometry of the tab [114] is complimentary to the circumference and geometry of a corresponding hole [120] in the frame [102], such that the tab [114] fits securely, but movably, within a hole [120] in the frame [102]. The tab [114] and hole [120] may be of any shape and dimension. In another embodiment of a blade element [108a] shown in FIG. 5, the tab [114] includes a flange [220] on the inner surface [104] side of the tab [114] which is of larger dimension than the hole [120] in the frame [102] complementary to the tab [114].

The flange [220] sits against the inner surface [104] of the frame [102] and prevents the blade element [108] from passing through the corresponding hole [120] in the frame [102] from the inner surface [104] to the outer surface [106]. This configuration allows pressure to be applied to the blade element [108] from the other blade elements present and the food being peeled while maintaining the blade element's position within the frame [102] and maintaining the aperture [118]. The configuration also provides a mechanism for user safety and ease of cleaning the apparatus as the blade elements [108] can be easily moved within, or completely removed from the, frame [102], allowing a change in the aperture [118] as follows: pressure may be applied to one or more tabs [114] in a direction from the outer surface [106] towards the inner surface [104], the tab or tabs [114] may be moved partially or completely through the complimentary hole [120] in the frame [102]; once pressure is applied to the tab or tabs [114] in the direction from the outer surface [106] to the inner surface [104], tension is released from the individual blade element or elements [108] connected to the tab or tabs [114] and the aperture [118] is expanded allowing food objects, fingers, or any other item in the aperture [118] to be safely removed without further cutting of the object by the blade elements [118].

If the tab or tabs [114] are pushed completely through the corresponding hole or holes [120] in the frame [102], individual blade elements [108] may be disengaged from the other blade elements and completely removed from the apparatus [100]. Once one or more individual blade elements are removed from the apparatus [100], an item caught in the aperture [118], or other part of the apparatus [100], may be safely removed without causing any further damage. Additional features of completely removing one or more blade elements [108] from the frame [102] in the manner described hereinabove include making the blade elements [108] and frame [102] easy to be cleaned by the user, allowing broken blade elements [108] to be easily replaced by a user, and allowing a user to easily replace the blade elements [108] with different types of blade elements, such as straight, serrated, julienne, corn dekerneler, or other types of blades that are known to those skilled in the art, allowing a single frame [102] to be paired with different types of blade elements [108] and used for different purposes. All of the benefits disclosed in this paragraph are unique to the invention claimed herein and are significant improvements to the prior art.

With reference to FIGS. 3, 4, 6 and 7, another embodiment of securing the blade elements [108a] within the frame [102a] is depicted. In this embodiment, the means of attaching the blade to the frame comprises a removable cap [132] placed on the outer end [112] of the blade element [108a]. The blade element [108a], without the removable cap [132], is passed through a corresponding hole [120] in the frame [102a] from the inner surface [104] to the outer surface [106]. Once the outer end [112] of the blade element [108a] is passed through to the outer surface [106] of the frame [102a], the removable cap [132] is secured over the outer end [112] of the blade element [108a]. The removable cap [132] is larger than the corresponding hole [120], thereby preventing the outer end [112] of the blade element [108a] from passing through its corresponding hole [120] from the outer surface [106] to the inner surface [104]. The removable cap [132] may be attached by a locking mechanism such as a clip, clasp, or friction device.

Individual blade elements [108a] may be removed from the frame [102a] by removing the removable cap [132] and passing the individual blade element [108a] through its corresponding hole [120] from the outer surface [106] to the inner surface [104]. Once one or more individual blade elements are removed from the apparatus, a finger or other item caught in the aperture [118], or other part of the apparatus [100], may be safely removed without causing any further damage. Additionally, this configuration allows the blade elements [108a] to be easily cleaned by the user. Further, if a blade element [108a] breaks, this configuration allows the user to easily replace the broken blade element. Finally, this configuration allows the user to easily replace the blade elements [108a] with different types of blade elements, such as straight, serrated, julienne, corn dekerneler, or other types of blades that are known to those skilled in the art. All of the benefits disclosed in this paragraph are unique to the invention claimed herein and are significant improvements to the prior art.

With reference to FIGS. 8, 9, 10, and 11, in one embodiment of the blade elements [108b], a spring [134] may be placed in the horizontal plane [206] of the blade element [108b] between the removable cap [132] and the outer surface of the frame [106], which spring [134] provides tension to the blade element [108b]. A spring guide [138] may be provided in the channel [208] of the blade element [108b] to hold the spring [134] in a desired orientation. The spring guide [138] may be attached to the removable cap [132]. The spring [134] pushes against a spring plate [136]. The spring plate [136] is larger than a corresponding hole [120] in the frame [102f] so that the spring plate [136] does not pass through the corresponding hole [120]. The spring [134] provides tension to the blade element [108b] by pushing against the blade element and drawing the blade element [108b] through a corresponding hole [120] from the inner surface [104] towards the outer surface [106]. The guide [116], interlocked with other blade elements [108b], prevents the blade element from being pushed completely through the corresponding hole [120] by the spring [134]. This embodiment provides additional blade tension between the blade element [108b] and the frame [102f], which may be desirable in some applications of the apparatus [100e].

Figure 6:
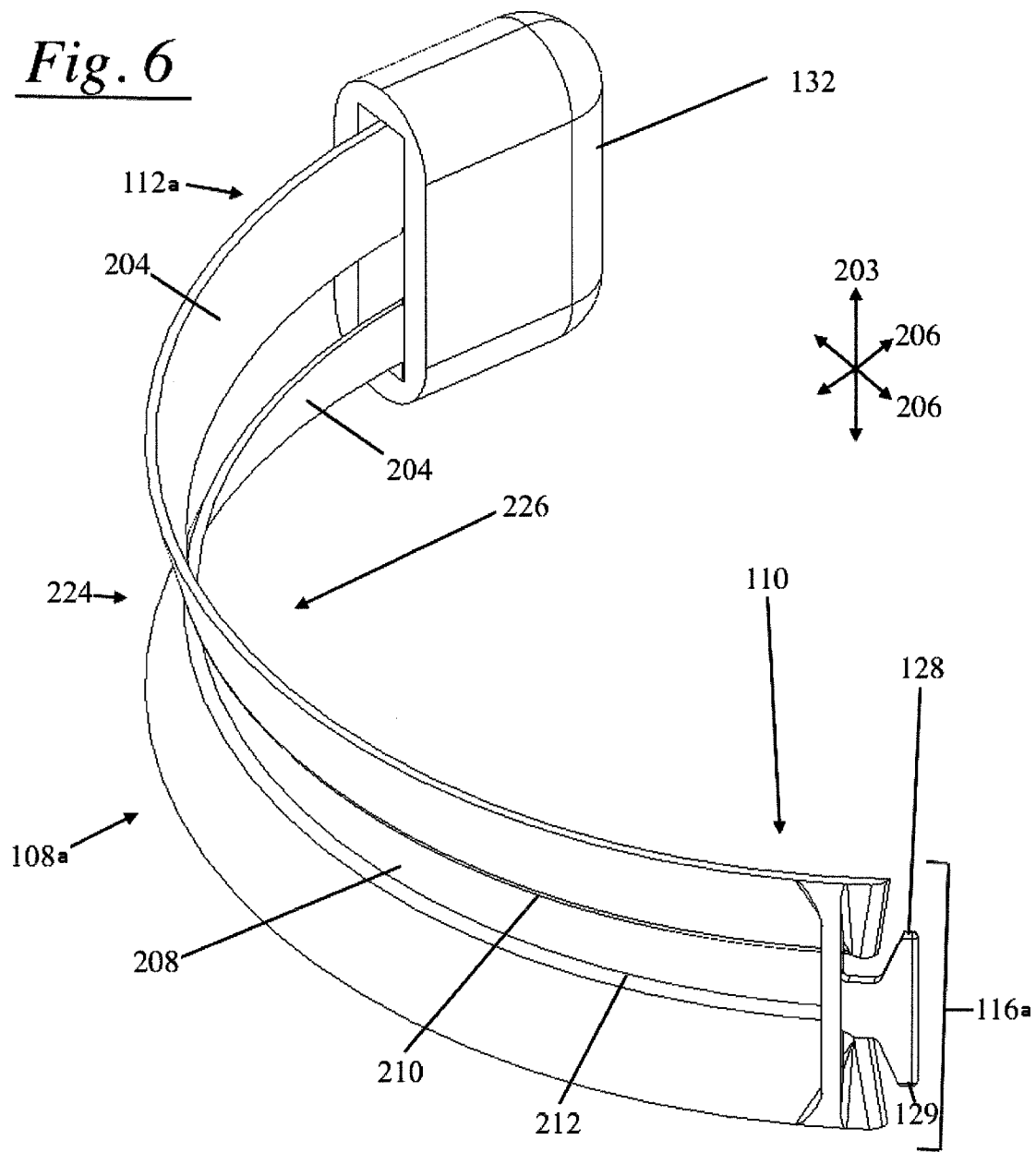
FIG. 6 is a perspective view of another embodiment of a blade element of the apparatus.

Regardless of the means of securing individual blade elements to the frame, the blades elements may be straight or curved. If curved as shown in FIG. 6, for example, the blade elements [108, 108a, 108b] have a convex side [224] and a concave side [226]. Additionally, all blade elements [108, 108a, 108b], regardless of type, shape, dimension, and attachment mechanism, have a guide [116, 116a]. With reference to FIGS. 5 and 8-11, one embodiment of the guide [116] comprises a top flange [124] and a bottom flange [125], wherein the top flange [124] and bottom flange [125] define a space [126] approximately equal to the height of the blade element [108, 108b] in the vertical plane [203]. The top flange [124] and bottom flange [125] may be in mechanical contact with the top edge [228] and bottom edge [230]

of a corresponding blade element [108, 108b], which are defined by a height of a corresponding blade element [108, 108b].

Figure 7:
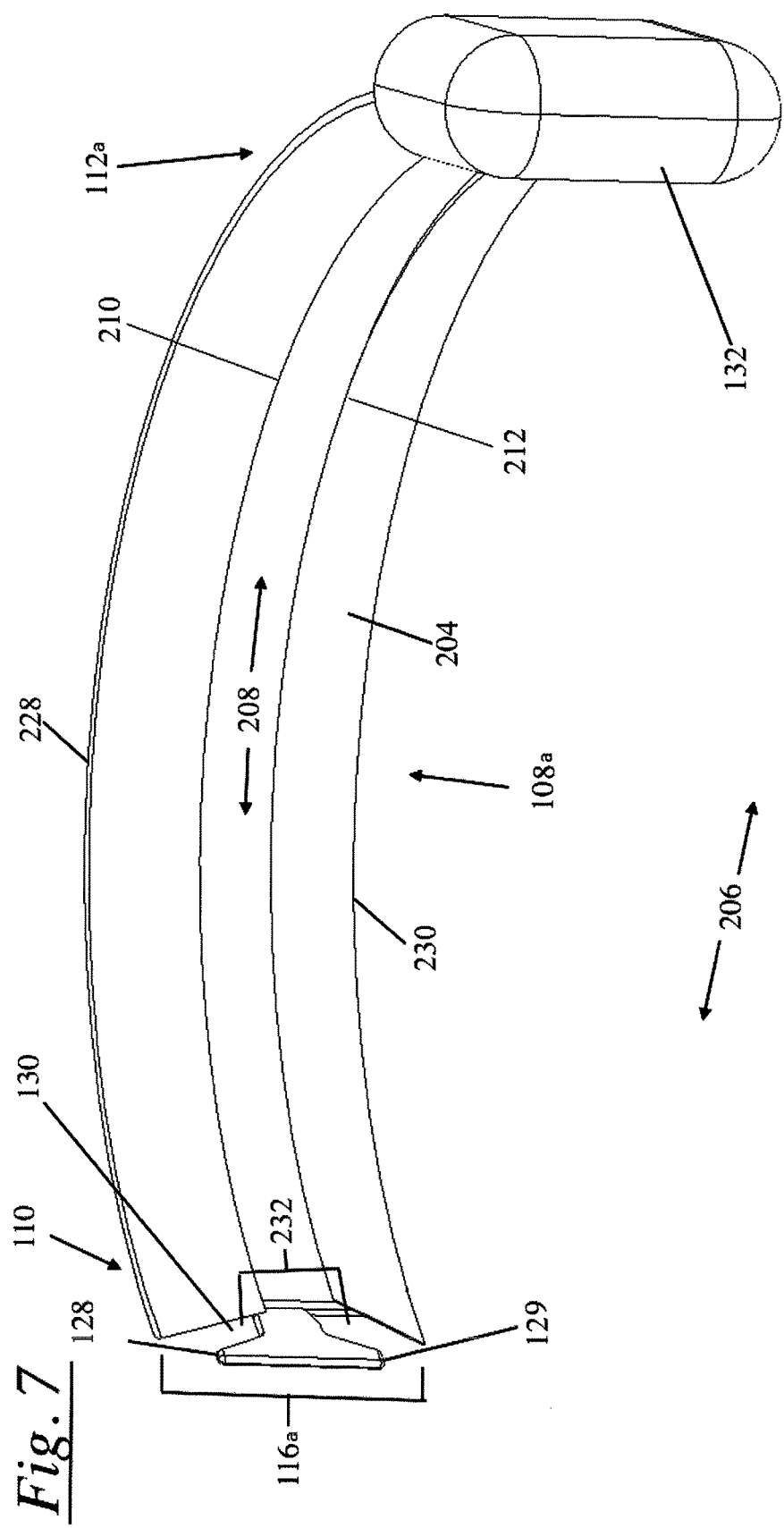
FIG. 7 is another perspective view of another embodiment of a blade element of the apparatus.
Figure 8:
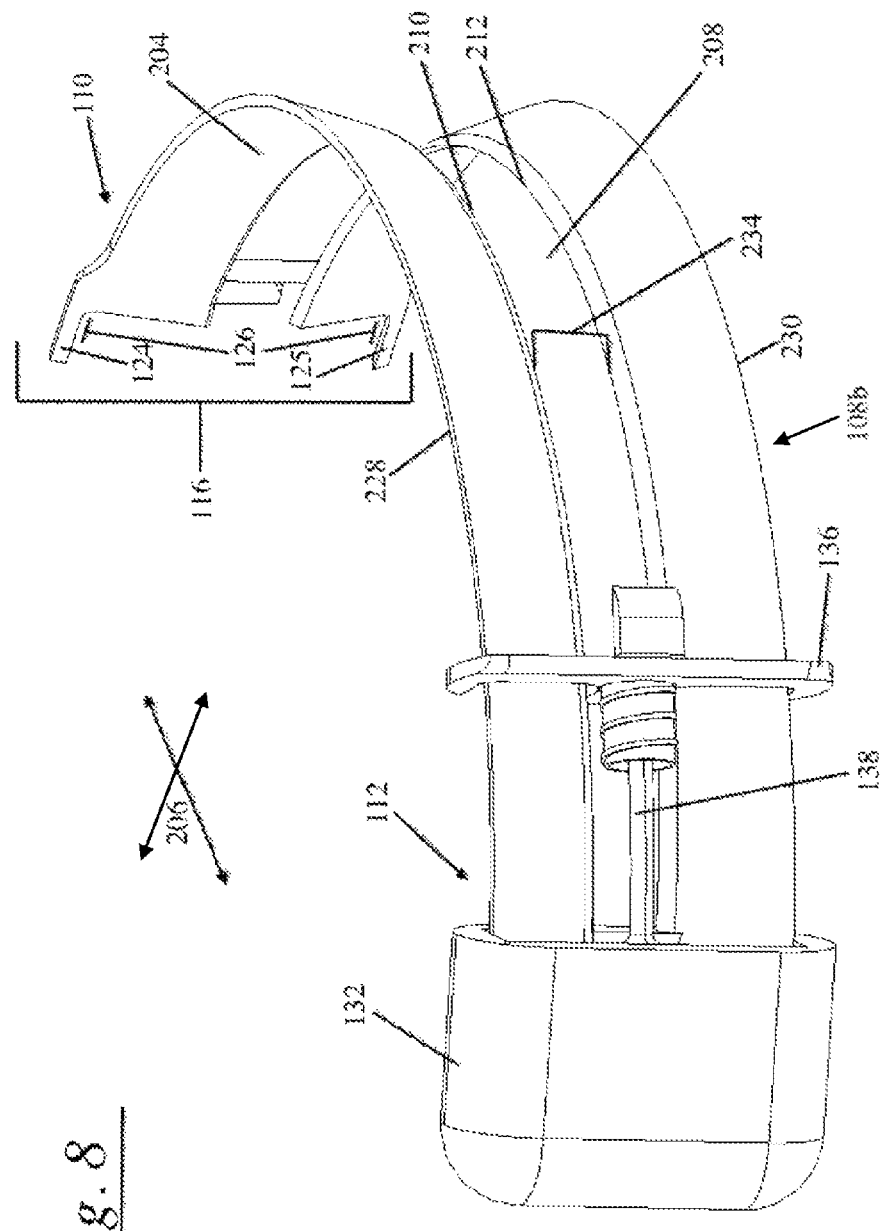
FIG. 8 is a perspective view of yet another embodiment of a blade element of the apparatus.
Figure 9:
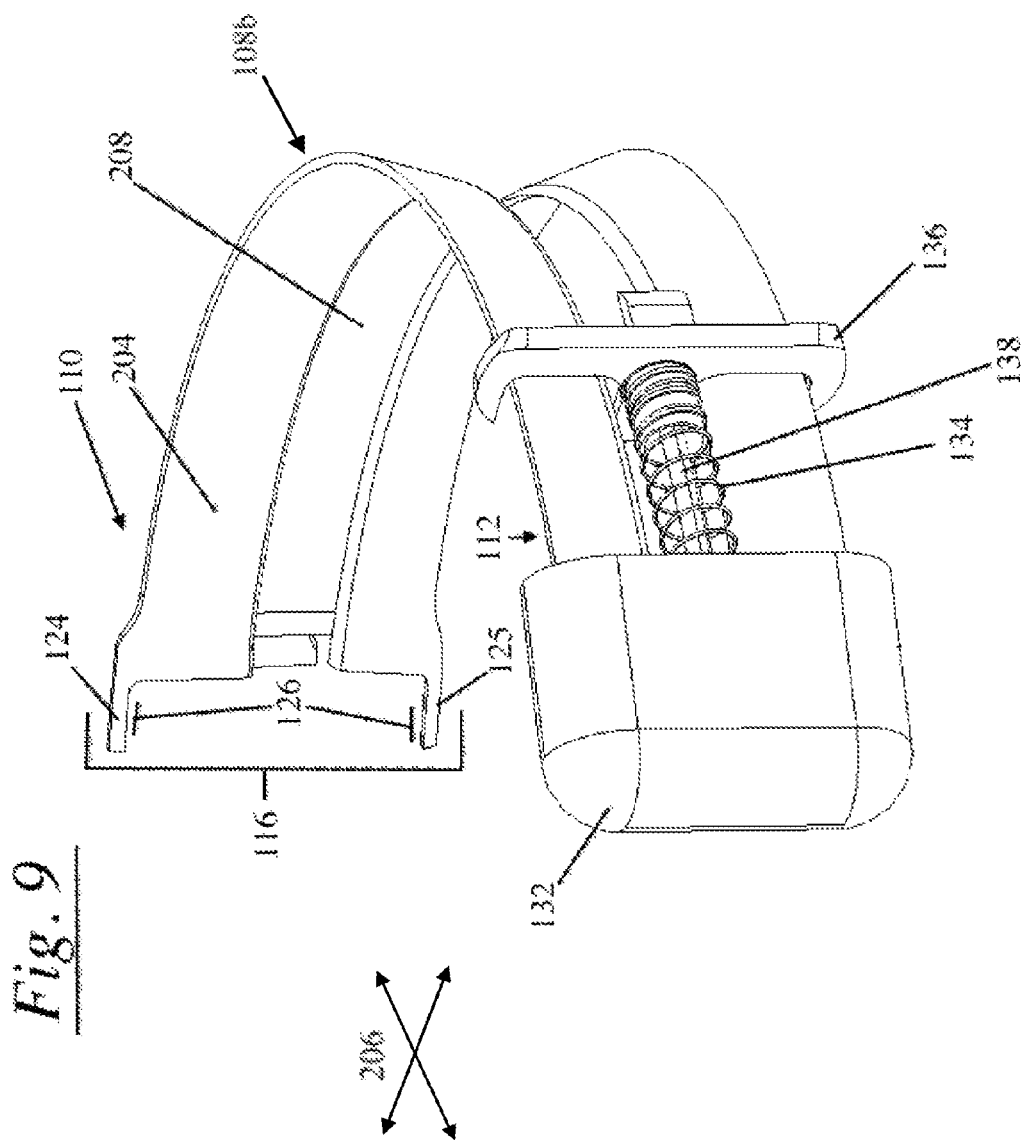
FIG. 9 is another perspective view of yet another embodiment of a blade element of the apparatus.
Figure 10:
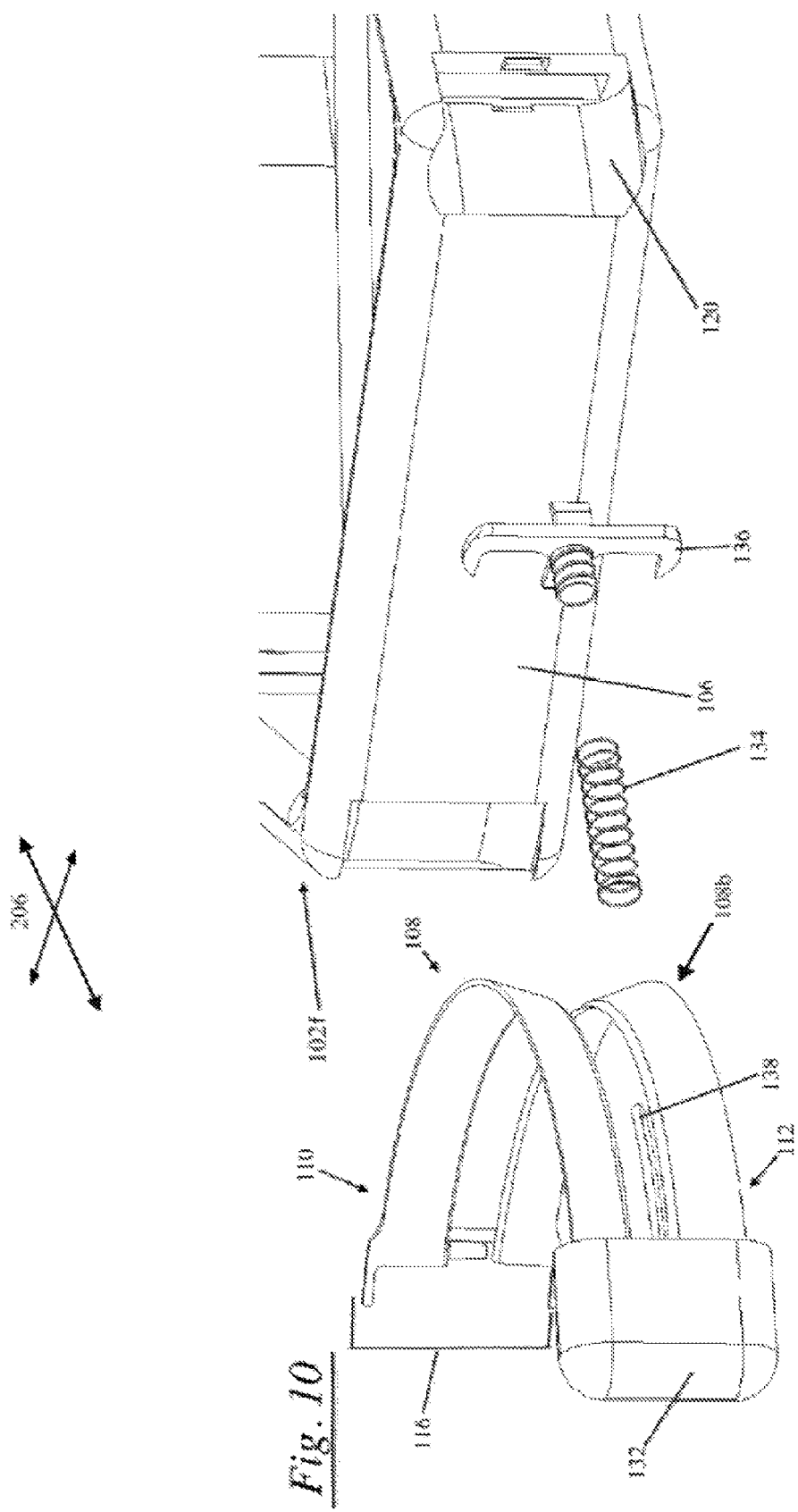
FIG. 10 is an exploded view of yet another embodiment of a blade element of the apparatus together with an embodiment of a frame of the apparatus.
Figure 11:
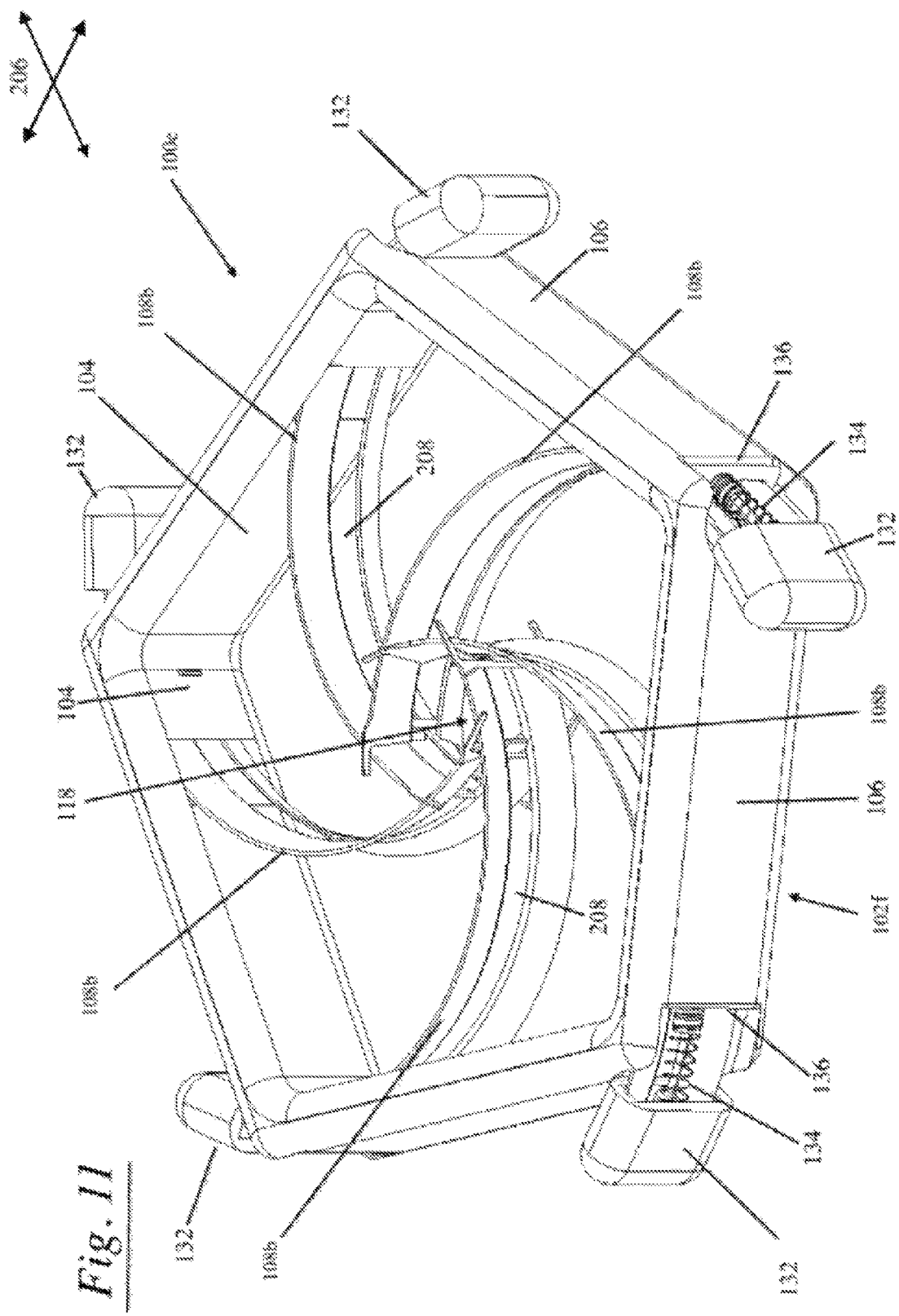
FIG. 11 is an orthogonal view of yet another embodiment of the apparatus.

With reference to FIGS. 6 and 7, another configuration of a blade guide [116a] comprises a top flange [128] and a bottom flange [129], wherein the top flange [128] and bottom flange [129] define a space [232] approximately equal to the height [234] of a channel [208] running in the horizontal plane of a corresponding blade [108a], the top flange [128] and bottom flange [129] in mechanical contact with the channel top [210] and channel bottom [212] edges of a corresponding blade element [108a], which edges are defined by a channel [208] running in the horizontal plane [206] of the corresponding blade surface.

Figure 12:
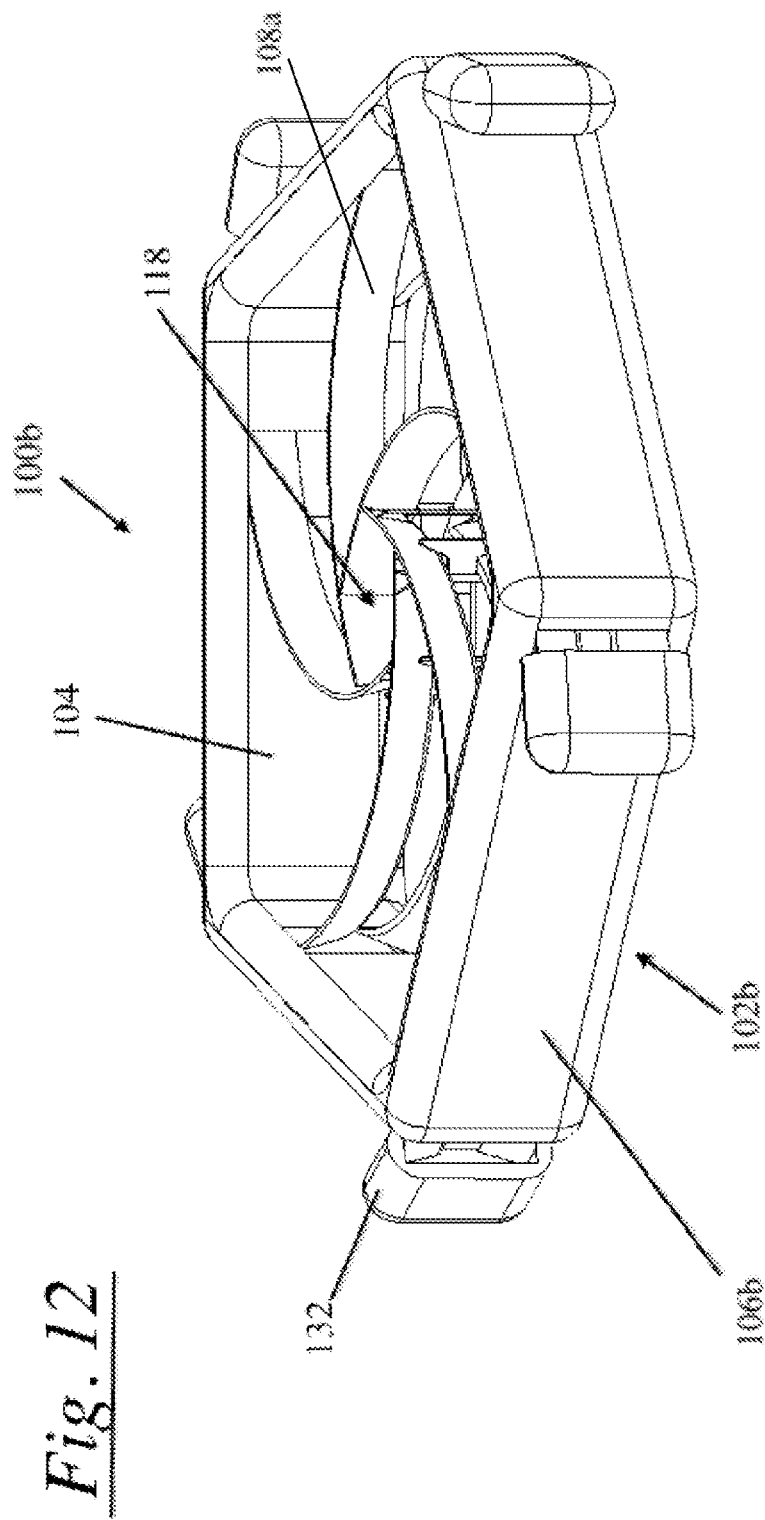
FIG. 12 is a perspective view of yet another embodiment of the apparatus.
Figure 13:
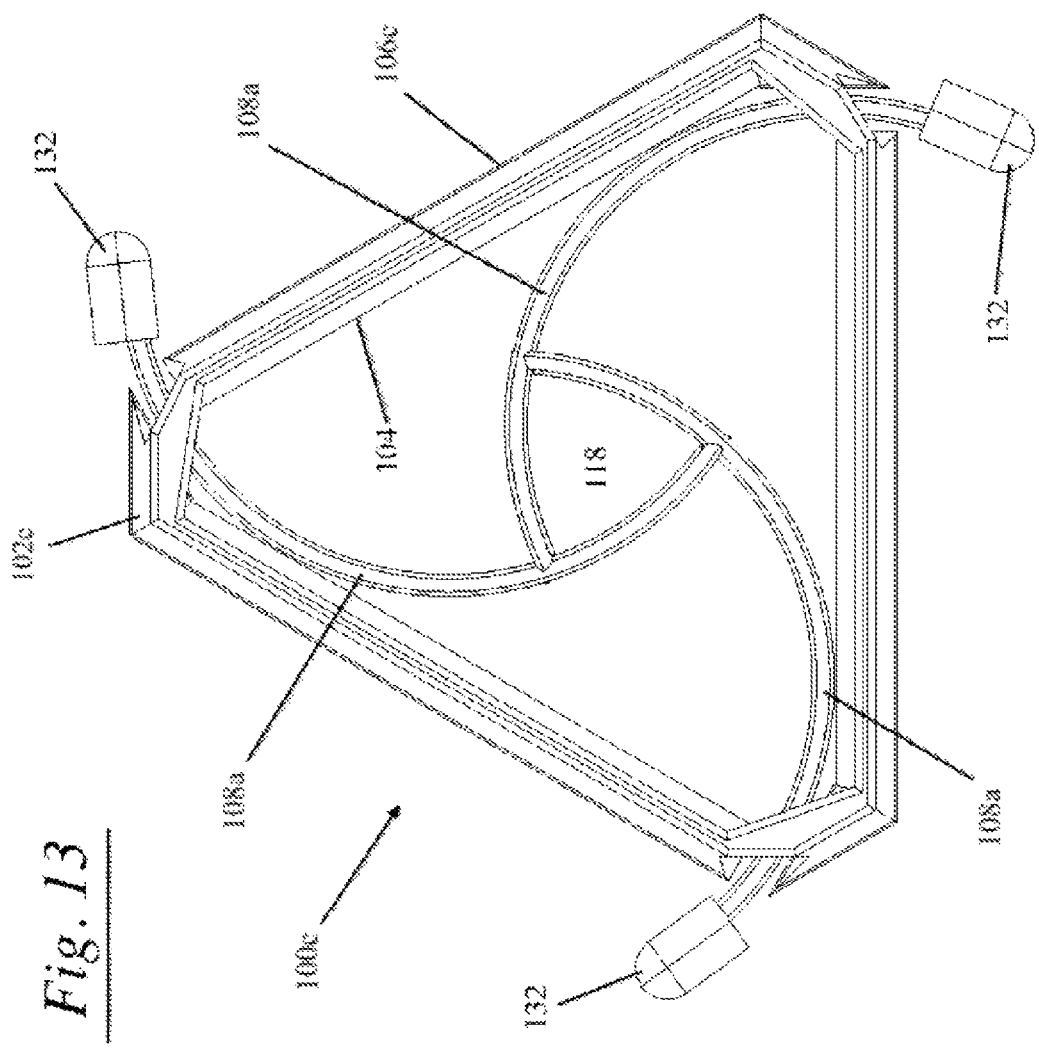
FIG. 13 is a top view of yet another embodiment of the apparatus.
Figure 14:
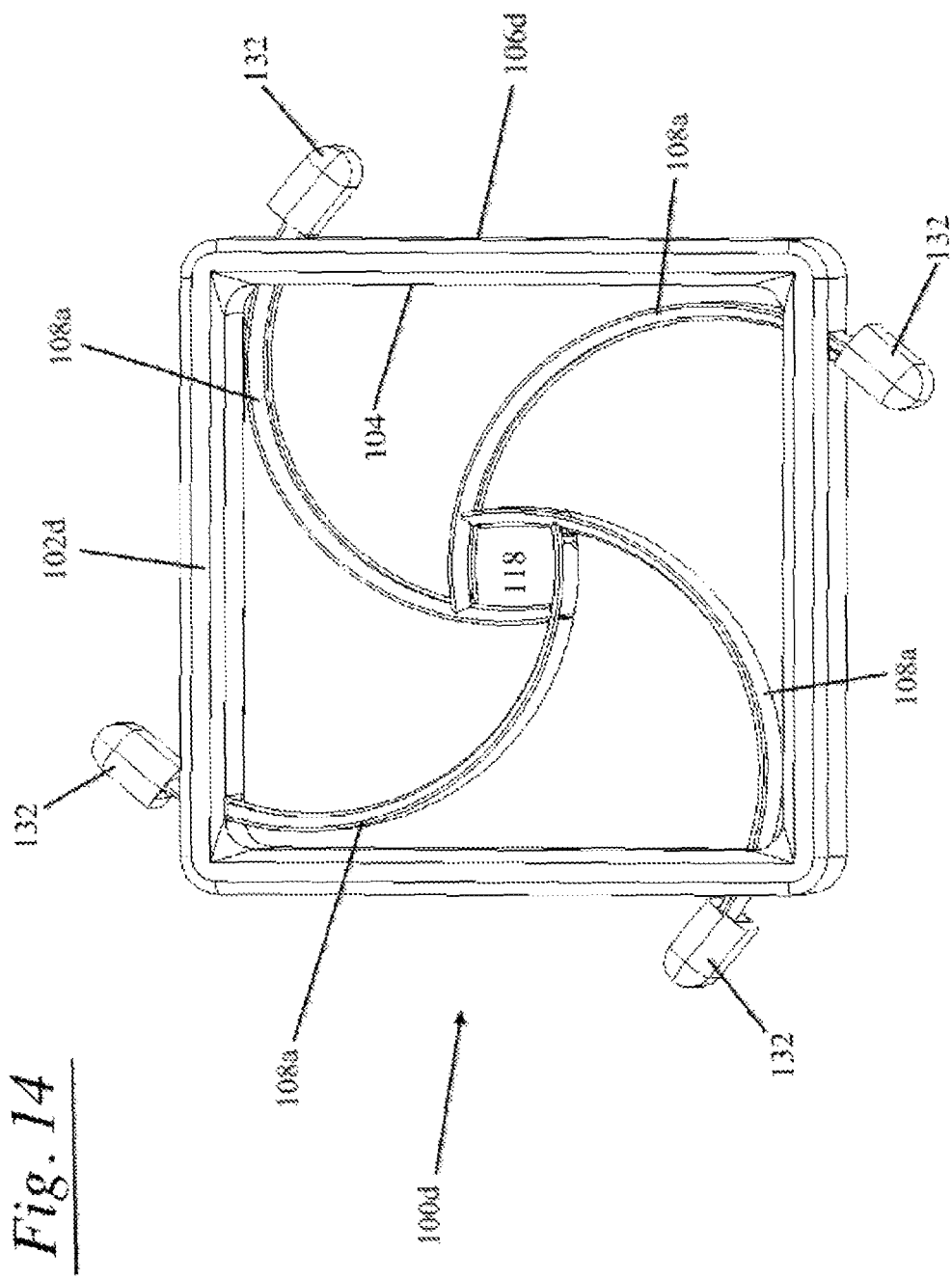
FIG. 14 is a top view of yet another embodiment of the apparatus.
Figure 15:
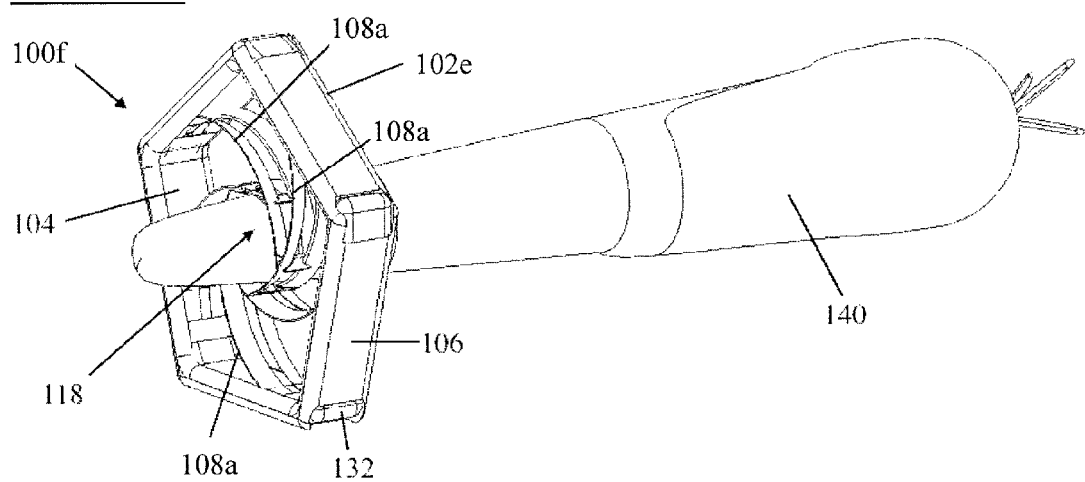
FIG. 15 is a perspective view of another embodiment of the apparatus in use peeling a carrot.
Figure 16:
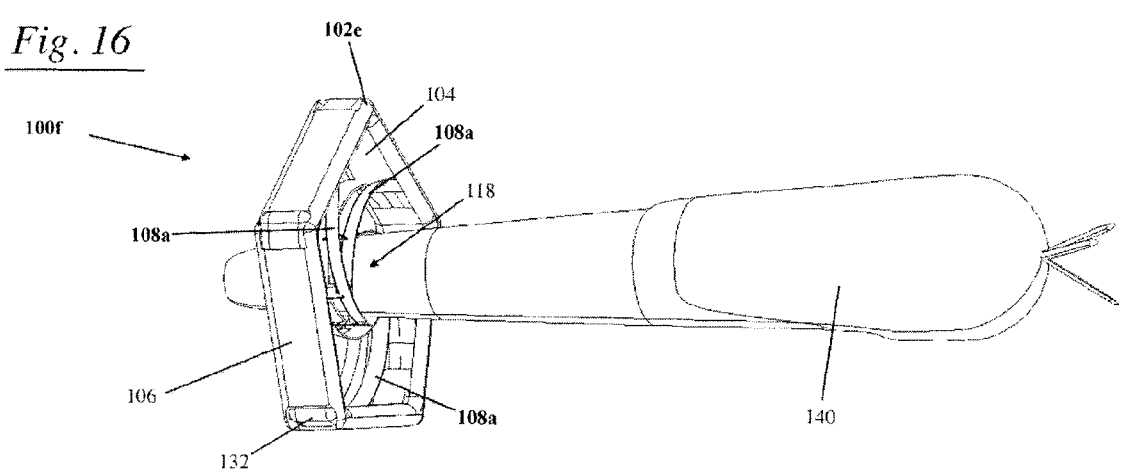
FIG. 16 is another perspective view of an embodiment of the apparatus in use peeling a carrot.
Figure 17:
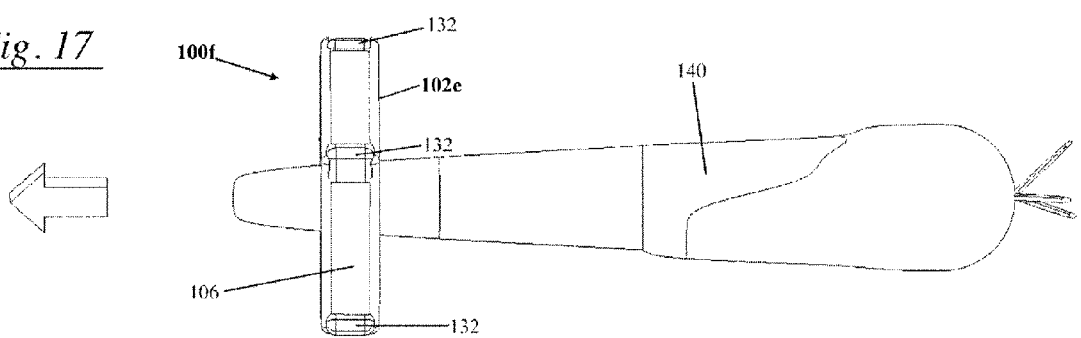
FIG. 17 is a side view of an embodiment of the apparatus in use peeling a carrot.

As shown in FIG. 12, the apparatus [100b] has a frame [102b] and the removable caps [132] extend outside of frame [102b]. Alternatively, as shown in FIGS. 15, 16, and 17, the apparatus [100f] has a frame [102e] that includes recesses for receiving each removable cap [132]. The apparatus [100f] is used by passing a food having a peel [140] through the aperture [118] of the apparatus [100ff].

For example, in use, a carrot [140] is forced through the aperture [118] and passes across the blade elements [108a]. As the item passes in contact with the blade elements [108a], the outer surface of the carrot is cut by the blade elements [108a] and is thus peeled as it is pushed through the aperture [118]. This is by way of example only as many other items may be passed through the apparatus [100f] and thus cut, peeled, or dekerneled.

It will be appreciated by persons skilled in the art that the present invention is not limited to what has been particularly shown and described herein above. It should be noted that the accompanying drawings are not to scale. A variety of modifications, variations, shapes and sizes are possible in light of the above teachings without departing from the scope and spirit of the invention.

What is claimed is:

1. An apparatus for peeling a food having a peel, comprising:
    a frame surrounding an open center and including:
        a top side,
        a bottom side,
        an inner surface,
        an outer surface,
        a thickness; and
    a plurality of holes traversing the thickness of the frame passing through both the inner surface and the outer surface of the frame; and
    a plurality of elongate blades disposed within the open center of the frame, wherein each of the plurality of elongate blades has a maximum length which extends substantially parallel to the top side of the frame and comprises:
        an inner end having a guide element formed therein or thereon,
        an outer end, and
        an elongated blade surface extending between the inner end and the outer end;
    wherein a portion of the outer end of each of the plurality of elongate blades is received within a respective one of the plurality of holes traversing the thickness of the frame,
    wherein the guide element on each of the plurality of elongate blades is slidably engaged with another one of the plurality of elongate blades to form an aperture between the plurality of elongate blades, and
    wherein sliding movement of the inner ends of the plurality of elongate blades relative to each other occurs in response to the food being urged through the aperture and causes the aperture to automatically vary in size to conform to the food as the food is passed through the aperture.

2. The apparatus of claim 1, wherein the outer end of each of the plurality of elongate blades includes a tab which is received within a respective one of the holes traversing the thickness of the frame.

3. The apparatus of claim 2, wherein each tab comprises a flange which abuts the inner surface of the frame.

4. The apparatus of claim 2 wherein a portion of each tab outwardly extends beyond the outer surface of the frame.

5. The apparatus of claim 1, wherein the blade surfaces are curved.

6. The apparatus of claim 1, wherein the guide element of each of the plurality of elongate blades comprises a top flange and a bottom flange forming a slot therebetween.

7. The apparatus of claim 1, wherein the guide element of each of the plurality of elongate blades outwardly extends from the inner end of the blade and comprises a top flange and a bottom flange and each of the plurality of elongate blades includes an elongated channel therein extending along the maximum length between the inner end and the outer end, wherein the guide element of each blade is slidably received in the channel of another one of the plurality of elongate blades.

8. The apparatus of claim 1, wherein the frame is circular.

9. The apparatus of claim 1, wherein the outer surface of the frame includes one or more indentations configured to make it easier for a user to grip the frame by hand.

10. The apparatus of claim 1, wherein each of the plurality of elongate blades is removable from the frame.

11. The apparatus of claim 1, wherein each of the plurality of elongate blades has a convex side and a concave side.

12. The apparatus of claim 1, wherein the blade surface of each of the plurality of elongate blades includes a cutting surface.

13. The apparatus of claim 1, further comprising a removable cap on the outer end of each of the plurality of elongate blades.

14. The apparatus of claim 13, wherein each of the plurality of elongate blades can be removed from the frame by removing a respective one of the removable caps from at least one of the plurality of elongate blades and passing the uncapped at least one of the plurality of elongate blades through a respective one of the plurality of holes traversing the thickness of the frame.

15. The apparatus of claim 1, wherein the portion of the outer end of each of the plurality of elongate blades is slidably received within a respective one of the holes in the frame.

16. The apparatus of claim 15 further comprising a spring associated with each of the plurality of elongate blades, each spring being disposed between the associated blade and the frame such that the outer end of the associated blade is biased in a direction outward from the frame.

17. The vegetable peeler of claim 15 wherein each blade includes an elongated channel extending along a substantial portion of the blade's maximum length which separates an upper blade portion from a lower blade portion, and wherein the upper blade portion includes a first cutting edge along one side of the channel and the lower blade portion includes a second cutting edge along an opposite side of the channel.

18. The vegetable peeler of claim 17 wherein the upper blade portion and the lower blade portion of each blade are oblique to each other.

\* \* \* \* \*